US008805853B2

(12) United States Patent
Ishikawa et al.

(10) Patent No.: US 8,805,853 B2
(45) Date of Patent: Aug. 12, 2014

(54) TEXT MINING SYSTEM FOR ANALYSIS TARGET DATA, A TEXT MINING METHOD FOR ANALYSIS TARGET DATA AND A RECORDING MEDIUM FOR RECORDING ANALYSIS TARGET DATA

(75) Inventors: Kai Ishikawa, Tokyo (JP); Shinichi Ando, Tokyo (JP); Akihiro Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 13/518,573

(22) PCT Filed: Dec. 15, 2010

(86) PCT No.: PCT/JP2010/073059
§ 371 (c)(1),
(2), (4) Date: Aug. 3, 2012

(87) PCT Pub. No.: WO2011/078194
PCT Pub. Date: Jun. 30, 2011

(65) Prior Publication Data
US 2012/0310950 A1   Dec. 6, 2012

(30) Foreign Application Priority Data
Dec. 25, 2009   (JP) ................................. 2009-294763

(51) Int. Cl.
*G06F 7/00*   (2006.01)
*G06F 17/30*   (2006.01)
(52) U.S. Cl.
USPC ............................ 707/748; 707/752; 707/755
(58) Field of Classification Search
None
See application file for complete search history.

(56) References Cited

U.S. PATENT DOCUMENTS

| 7,194,483 | B1* | 3/2007 | Mohan et al. ................. 707/600 |
| 7,890,514 | B1* | 2/2011 | Mohan et al. ................. 707/748 |
| 2006/0039607 | A1 | 2/2006 | Tanaka et al. |
| 2012/0197894 | A1* | 8/2012 | Noh et al. ..................... 707/737 |

FOREIGN PATENT DOCUMENTS

| JP | 2005165754 A | 6/2005 |
| JP | 2005326922 A | 11/2005 |
| JP | 2006323443 A | 11/2006 |
| WO | 2008062822 A1 | 5/2008 |

OTHER PUBLICATIONS

International Search Report for PCT/JP2010/073059 mailed Jan. 25, 2011.
Written Opinion of the International Search Authority for PCT/JP2010/073059 mailed Jan. 25, 2011.

* cited by examiner

*Primary Examiner* — Uyen Le
(74) *Attorney, Agent, or Firm* — Sughrue Mion, PLLC

(57) ABSTRACT

A text mining system including an analysis target search unit which judges whether a commonality in expressions among text data exists, an analysis viewpoint generation unit which generates an analysis viewpoint to extract an expression from the target data, a positive example set identification unit which identifies a positive example set including an expression matching the generated analysis viewpoint in the target data, a characteristic quantity calculation unit which calculates a characteristic quantity showing a degree of characterizing the positive example set of expressions in the target data, and a characteristic expression ranking unit which extracts expressions having the calculated characteristic quantity equal to or greater than a predetermined threshold as characteristic expressions and ranks the extracted characteristic expressions, and the target search unit extracts the analysis viewpoint among which a difference in ranks provided for the characteristic expressions is equal to or greater than a predetermined threshold.

11 Claims, 9 Drawing Sheets

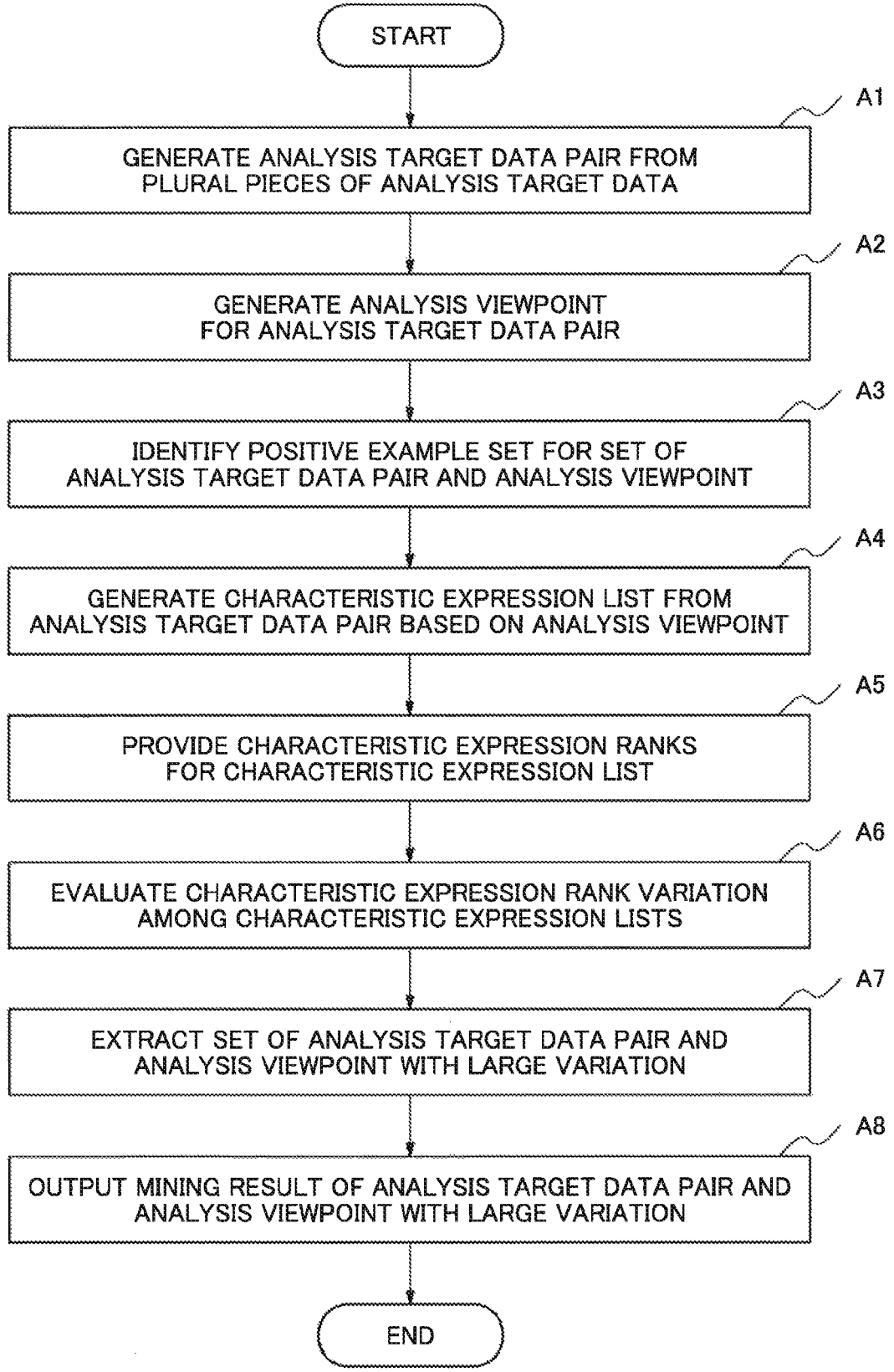

Fig.5

| ID | POSTED DATE AND TIME | TYPE | BRAND NAME | AGE | EVALUATION | CUSTOMER'S VOICE |
|---|---|---|---|---|---|---|
| 1 | 2009/9/4 18:00 | SKIN LOTION | EX-AGE | 24 | 5 | PURCHASING REPEATEDLY SINCE IT HAS EFFECT ON CALMING SENSITIVE SKIN WHEN HAVING SKIN TROUBLES. ALTHOUGH MOISTURE WAS NOT COMPLETELY SATISFACTORY AND FRAGRANCE SEEMED TO BE STRONG IN THE BEGINNING, I LIKE IT NOW. |
| 2 | 2009/9/4 18:30 | SKIN LOTION | EX-AGE | 30 | 3 | USED A SAMPLE I GOT AT A DEPARTMENT STORE. FRAGRANCE WAS STRONG AND I AM FINISHED WITH THE SAMPLE. IT PROVIDED SUFFICIENT MOISTURE TO SKIN AND SKIN HAD SPRINGY TEXTURE. IF FRAGRANCE WERE GOOD, I WOULD USE IT. |
| 3 | 2009/9/4 18:40 | SKIN LOTION | DONNA | 38 | 5 | AS I AM TROUBLED WITH ATOPIC ALLERGY, I AM CAUTIOUS ABOUT INGREDIENTS. BESIDE NANO-TECHNOLOGY IS NOT USED, I DON'T HAVE ALLERGY TO ANY OF NATURAL INGREDIENTS IN IT. I AM USING IT WITHOUT NO PROBLEM. THERE ARE ONLY A FEW GOODS WITH SO MANY INGREDIENTS MIXED AND YET SUIT MY SKIN, AND I FIND IT VERY USEFUL. |
| ... | ... | ... | ... | ... | ... | ... |

Fig.6

(CALL, LOG), (CALL, MAIL), (CALL, SITE), (CALL, BOARD B), (CALL, BOARD C), (CALL, BOARD D), (CALL, BOARD E), (CALL, BOARD F), (LOG, MAIL), (LOG, SITE), (LOG, BOARD A), (LOG, BOARD B), (LOG, BOARD C), (LOG, BOARD D), (LOG, BOARD E), (LOG, BOARD F), (MAIL, SITE), (MAIL, BOARD A), (MAIL, BOARD B), (MAIL, BOARD C), (MAIL, BOARD D), (MAIL, BOARD E), (MAIL, BOARD F), (SITE, BOARD A), (SITE, BOARD B), (SITE, BOARD C), (SITE, BOARD D), (SITE, BOARD E), (SITE, BOARD F), (BOARD A, BOARD B), (BOARD A, BOARD C), (BOARD A, BOARD D), (BOARD A, BOARD E), (BOARD A, BOARD F), (BOARD B, BOARD C), (BOARD B, BOARD D), (BOARD B, BOARD E), (BOARD B, BOARD F), (BOARD C, BOARD D), (BOARD C, BOARD E), (BOARD C, BOARD F), (BOARD D, BOARD E), (BOARD D, BOARD F), (BOARD E, BOARD F)

Fig.7

| ID | DEFINITION OF ANALYSIS VIEWPOINT (DESCRIBED BY CONDITIONAL EQUATION FOR RANGE OF ATTRIBUTE VALUE) |
|---|---|
| 1 | EVALUATION = [1, 2, 3] & AGE = [10-19] |
| 2 | EVALUATION = [1, 2, 3] & AGE = [20-29] |
| 3 | EVALUATION = [1, 2, 3] & AGE = [30-39] |
| 4 | EVALUATION = [1, 2, 3] & AGE = [40-49] |
| 5 | EVALUATION = [1, 2, 3] & AGE = [50-59] |
| 6 | EVALUATION = [4, 5, 6] & AGE = [10-19] |
| : | : |

Fig.8

| ID | DEFINITION OF ANALYSIS VIEWPOINT (DESCRIBED BY CONDITIONAL EQUATION FOR RANGE OF ATTRIBUTE VALUE) |
|---|---|
| 1 | EVALUATION = [D, E] & AGE = [10-19] |
| 2 | EVALUATION = [D, E] & AGE = [20-29] |
| 3 | EVALUATION = [D, E] & AGE = [30-39] |
| 4 | EVALUATION = [D, E] & AGE = [40-49] |
| 5 | EVALUATION = [D, E] & AGE = [50-59] |
| 6 | EVALUATION = [B, C] & AGE = [10-19] |
| : | : |

Fig.9

| ANALYSIS VIEWPOINT (ID) OF "BOARD A" | ANALYSIS VIEWPOINT (ID) OF "BOARD B" |
|---|---|
| 1 | 1 |
| 2 | 2 |
| 3 | 3 |
| 4 | 4 |
| 5 | 5 |
| 6 | 6 |
| ⋮ | ⋮ |

Fig.10

| CHARACTERISTIC EXPRESSION RANK | CHARACTERISTIC EXPRESSION | CHARACTERISTIC QUANTITY |
|---|---|---|
| 1 | FRAGRANCE | 66.41 |
| 2 | MOISTURE | 46.30 |
| 3 | INGREDIENTS | 23.38 |
| ⋮ | ⋮ | ⋮ |

TEXT MINING SYSTEM FOR ANALYSIS TARGET DATA, A TEXT MINING METHOD FOR ANALYSIS TARGET DATA AND A RECORDING MEDIUM FOR RECORDING ANALYSIS TARGET DATA

TECHNICAL FIELD

The present invention relates to a text mining system, a text mining method and a recording medium.

BACKGROUND ART

An example of a text mining system aimed at an analysis of plural pieces of analysis target data is disclosed in patent literature 1.

The analysis target data of this text mining system includes the data mentioned below. The data includes plural pieces of analysis target data which are acquired during different periods of time such as "pieces of data of April from 2000 to 2009". Also, the data includes, for example, plural pieces of analysis target data which are acquired by various different means such as text recorded in a call at a call center, answer history, e-mails, various electronic bulletin boards (hereinafter, referred to as a bulletin board) on the web (World Wide Web), and questionnaires.

This text mining system includes, as shown in FIG. 1, an input device 10, an output device 20, a data processing device 30 and a storing device 40.

The storing device 40 includes an analysis target data storing means 41 and a characteristic expression list storing means 42. The analysis target data storing means 41 stores two or more text data sets as pieces of analysis target data. The characteristic expression list storing means 42 stores a set of characteristic expressions and degrees of a characteristic thereof obtained by a characteristic expression extraction means as a characteristic expression list.

The data processing device 30 includes a characteristic expression extraction means 31, a comparison setting means 32, a comparison list display means 33 and a comparison characteristic extraction means 34. The characteristic expression extraction means 31 extracts a set of characteristic expressions and degrees of a characteristic thereof from each piece of analysis target data as a characteristic expression list. The comparison setting means 32 sets a comparison condition based on analyst's input information. The comparison list display means 33 displays a characteristic expression list of analysis target data which is a target of comparison analysis as a comparison list. The comparison characteristic extraction means 34 executes comparison analysis and extracts a comparison characteristic from the comparison list according to the set comparison condition.

The text mining system including such a configuration operates as follows. That is, the characteristic expression extraction means 31 executes processing which extracts a characteristic expression from two or more pieces of analysis target data, and stores a set of extracted characteristic expressions and degrees of characteristic thereof as a characteristic expression list in the characteristic expression list storing means 42. When the comparison setting means 32 sets a comparison condition based on analyst's input information, the comparison list display means 33 controls in such a way that a characteristic expression list of analysis target data is displayed as a comparison list. Also, the comparison characteristic extraction means 34 operates to perform comparison analysis to extract a comparison characteristic from the comparison list according to the comparison condition and to output it.

CITATION LIST

Patent Literature

[Patent Literature 1] Japanese Patent Application Laid-Open No. 2005-165754

SUMMARY OF INVENTION

Technical Problem

There are the following problems on each of the systems mentioned above. In case plural pieces of analysis target data are analyzed, parts of these pieces of analysis target data including a difference which should be compared and analyzed with priority may need to be analyzed, exhaustively. In this case, there is a problem that time, labor and so on necessary for analysis by an analyst (hereinafter, also referred to as a cost of analyzing) becomes remarkably large in each of the systems mentioned above.

The reasons are as follows. The first reason is, in order for an analyst to analyze the parts of plural pieces of analysis target data including a difference which should be compared and analyzed with priority, exhaustively, it is necessary to compare and analyze all analysis target data pairs including two different pieces of analysis target data. Further, in the comparison analysis of each analysis target data pair, it is necessary to set all of common viewpoints of analysis to both pieces of the analysis target data which form the pair and to analyze exhaustively whether a difference is caused for each of the viewpoints. The second reason is that a cost of analyzing increases remarkably as the number of combinations of the analysis target data pairs and the viewpoints of analysis is increased.

Accordingly, the object of the present invention is to provide a text mining system, a text mining method and a recording medium which, in case plural pieces of analysis target data are analyzed, can analyze parts of these pieces of analysis target data including a difference which should be compared and analyzed with priority, exhaustively, with suppressing a cost of analyzing by an analyst.

Solution to Problem

A text mining system according to an exemplary aspect of the invention includes an analysis target data pair search unit which judges whether there is a commonality in expressions among pieces of text data, the pieces of text data being included in plural pieces of analysis target data, respectively, an analysis viewpoint generation unit which generates an analysis viewpoint which is a condition to extract an expression from each of the pieces of analysis target data with a commonality in such a way that characteristic expression lists, each of which is a set of characteristic expressions satisfying a predetermined condition in text data included in each of the pieces of analysis target data, are different among the pieces of analysis target data, a positive example set identification unit which identifies a positive example set including an expression matching the generated analysis viewpoint in each of the pieces of analysis target data, a characteristic quantity calculation unit which calculates a characteristic quantity showing a degree of characterizing the positive example set for each of expressions in each of the pieces of analysis target data, and a characteristic expression ranking unit which extracts expressions each having the calculated characteristic quantity being equal to or greater than a predetermined threshold as characteristic expressions and provides ranks for the extracted characteristic expressions in descending order of the calculated characteristic quantity, wherein the analysis target data pair search unit extracts the analysis viewpoint for the pieces of analysis target data among which a difference in ranks provided for each of the characteristic expressions is equal to or greater than a predetermined threshold.

A text mining method according to an exemplary aspect of the invention includes judging whether there is a commonality in expressions among pieces of text data, the pieces of text data being included in plural pieces of analysis target data, respectively, generating an analysis viewpoint which is a condition to extract an expression from each of the pieces of analysis target data with a commonality in such a way that characteristic expression lists, each of which is a set of characteristic expressions satisfying a predetermined condition in text data included in each of the pieces of analysis target data, are different among the pieces of analysis target data, identifying a positive example set including an expression matching the generated analysis viewpoint in each of the pieces of analysis target data, calculating a characteristic quantity showing a degree of characterizing the positive example set for each of expressions in each of the pieces of analysis target data, extracting expressions each having the calculated characteristic quantity being equal to or greater than a predetermined threshold as characteristic expressions, providing ranks for the extracted characteristic expressions in descending order of the calculated characteristic quantity, and extracting the analysis viewpoint for the pieces of analysis target data among which a difference in ranks provided for each of the characteristic expressions is equal to or greater than a predetermined threshold.

A computer readable storage medium according to an exemplary aspect of the invention, records thereon a program for text mining, causing a computer to perform a method including judging whether there is a commonality in expressions among pieces of text data, the pieces of text data being included in plural pieces of analysis target data, respectively, generating an analysis viewpoint which is a condition to extract an expression from each of the pieces of analysis target data with a commonality in such a way that characteristic expression lists, each of which is a set of characteristic expressions satisfying a predetermined condition in text data included in each of the pieces of analysis target data, are different among the pieces of analysis target data, identifying a positive example set including an expression matching the generated analysis viewpoint in each of the pieces of analysis target data, calculating a characteristic quantity showing a degree of characterizing the positive example set for each of expressions in each of the pieces of analysis target data, extracting expressions each having the calculated characteristic quantity being equal to or greater than a predetermined threshold as characteristic expressions, providing ranks for the extracted characteristic expressions in descending order of the calculated characteristic quantity, and extracting the analysis viewpoint for the pieces of analysis target data among which a difference in ranks provided for each of the characteristic expressions is equal to or greater than a predetermined threshold.

Advantageous Effect of Invention

According to the present invention, in case plural pieces of analysis target data are analyzed, it is possible to analyze parts of these pieces of analysis target data including a difference which should be compared and analyzed with priority, exhaustively, with suppressing a cost of analyzing by an analyst.

BRIEF DESCRIPTION OF DRAWINGS

FIG. 4 A flowchart showing an example of operation which the text mining system executes.

FIG. 5 An explanatory drawing showing a specific example of analysis target data "board A".

FIG. 6 An explanatory drawing showing a specific example of analysis target data pairs.

FIG. 7 An explanatory drawing showing a specific example of analysis viewpoints for the analysis target data "board A".

FIG. 8 An explanatory drawing showing a specific example of analysis viewpoints for analysis target data "board B".

FIG. 9 An explanatory drawing showing a specific example of correspondence relationships between analysis viewpoints for analysis target data "board A" and "board B".

FIG. 10 An explanatory drawing showing a specific example of a characteristic word list obtained from the analysis target data "board A" based on the analysis viewpoint "evaluation=[1, 2, 3] & age=[30-39]".

DESCRIPTION OF EMBODIMENTS

Figure 3:
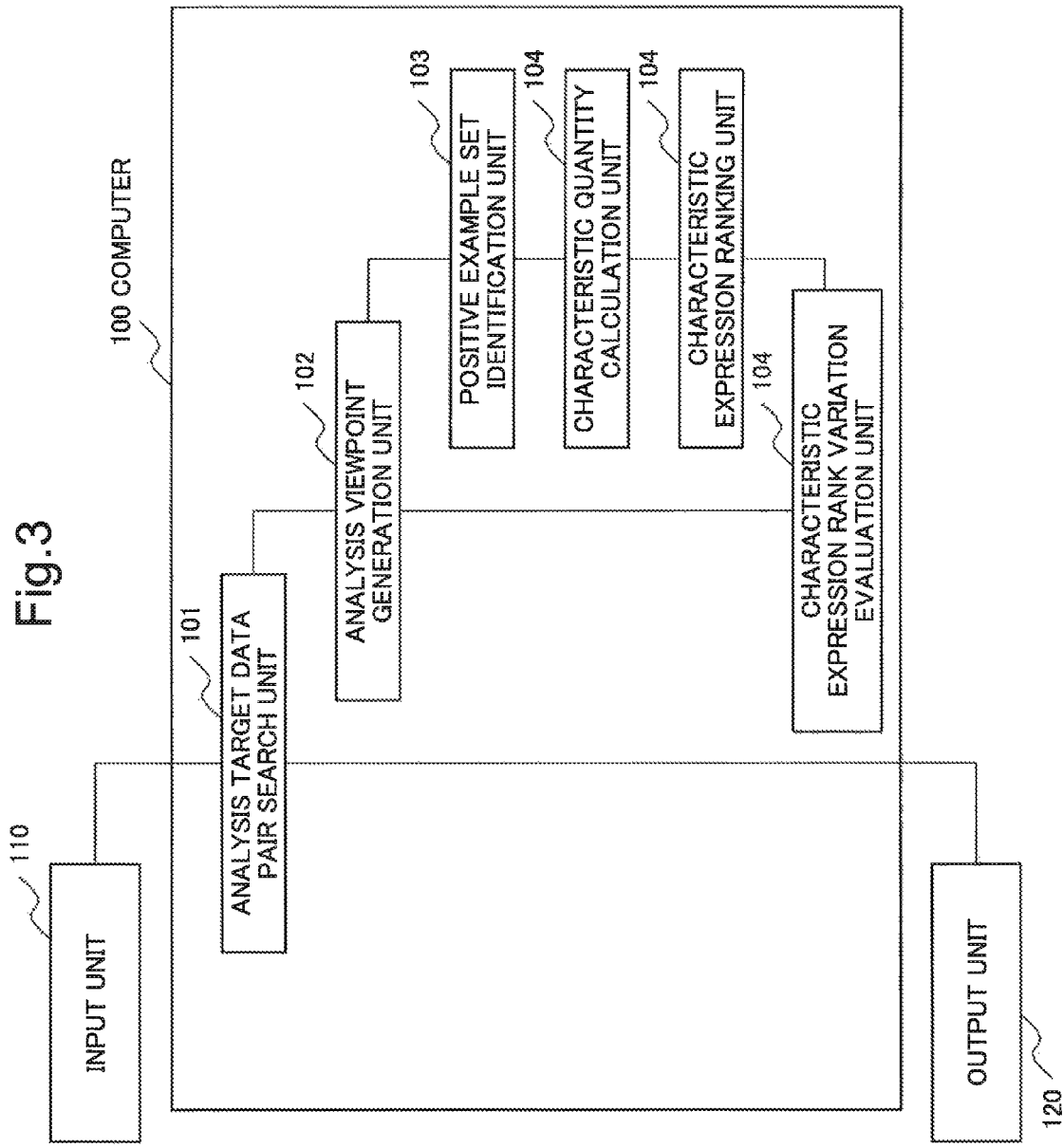
FIG. 3 A block diagram showing an exemplary configuration of a text mining system according to the present invention.

Next, an exemplary embodiment of a text mining system according to the present invention will be described with reference to drawings. FIG. 3 is a block diagram showing an example of a configuration of thr text mining system according to this exemplary embodiment.

Referring to FIG. 3, the text mining system according to this exemplary embodiment includes a computer 100 which operates by program control (for example, realized by a central processing unit, a processor or a data processing device), an input unit 110 and an output unit 120.

The computer 100 includes an analysis target data pair search unit 101, an analysis viewpoint generation unit 102, a positive example set identification unit 103, a characteristic quantity calculation unit 104, a characteristic expression ranking unit 105 and a characteristic expression rank variation evaluation unit 106. These units respectively operate as follows.

The analysis target data pair search unit 101 is realized, specifically, by a CPU (Central Processing Unit) of an information processing device which operates according to a program. The analysis target data pair search unit 101 includes a function to input plural pieces of analysis target data from the input unit 110 and to generate plural analysis target data pairs including two pieces of analysis target data among the plural pieces of analysis target data. The analysis target data pair search unit 101 includes a function to output the plural analysis target data pairs generated to the analysis viewpoint generation unit 102. The analysis target data pair search unit 101 includes a function to input plural sets of an analysis target data pair and an analysis viewpoint with a large characteristic expression rank variation and characteristic expression lists of both pieces of the analysis target data included in the analysis target data pair from the analysis viewpoint generation unit 102. The analysis target data pair search unit 101 includes a function to judge the analysis target data pair inputted from the analysis viewpoint generation unit 102 as the analysis target data pair with a difference. The analysis target data pair search unit 101 includes a function to output the characteristic expression lists extracted from individual pieces of analysis target data of the analysis target data pair to the output unit 120 as a mining result.

The analysis viewpoint generation unit 102 is realized, specifically, by a CPU of an information processing device which operates according to a program. The analysis viewpoint generation unit 102 includes a function to input the plural analysis target data pairs from the analysis target data pair search unit 101 and to search for a common analysis viewpoint which can be set for both pieces of the analysis target data of each of the plural analysis target data pairs. The analysis viewpoint generation unit 102 includes a function to generate plural sets of the analysis target data pair and the analysis viewpoint searched for by the above function. The analysis viewpoint generation unit 102 includes a function to output the plural sets of the analysis target data pair and the analysis viewpoint generated to the positive example set identification unit 103. The analysis viewpoint generation unit 102 includes a function to input plural sets of the analysis target data pair and the analysis viewpoint with characteristic expression lists of both pieces of the analysis target data included in the analysis target data pair and a characteristic expression rank variation for the analysis target data pair from the characteristic expression rank variation evaluation unit 106. The analysis viewpoint generation unit 102 includes a function to perform following processing for the set of the analysis target data pair and the analysis viewpoint with a large value of the characteristic expression rank variation inputted from the characteristic expression rank variation evaluation unit 106. That is, the analysis viewpoint generation unit 102 includes a function to output the set of the analysis target data pair and the analysis viewpoint with the characteristic expression lists of both pieces of the analysis target data included in the analysis target data pair to the analysis target data pair search unit 101.

The positive example set identification unit 103 is realized, specifically, by a CPU of an information processing device which operates according to a program. The positive example set identification unit 103 includes a function to input the plural sets of the analysis target data pair and the analysis viewpoint from the analysis viewpoint generation unit 102. The positive example set identification unit 103 includes a function to execute following processing for each set of the analysis target data pair and the analysis viewpoint inputted from the analysis viewpoint generation unit 102. That is, the positive example set identification unit 103 includes a function to identify positive example text sets (hereinafter, also referred to as positive example sets) of respective pieces of the analysis target data included in the analysis target data pair based on the analysis viewpoint. The positive example set identification unit 103 includes a function to output each set of the analysis target data pair and the analysis viewpoint with all the text sets and the identified positive example text sets of respective pieces of the analysis target data included in the analysis target data pair to the characteristic quantity calculation unit 104. Note that, a positive example text set is a text set which matches an analysis viewpoint.

The characteristic quantity calculation unit 104 is realized, specifically, by a CPU of an information processing device which operates according to a program. The characteristic quantity calculation unit 104 includes a function to input each set of the analysis target data pair and the analysis viewpoint with all the text sets and the positive example text sets of respective pieces of the analysis target data included in the analysis target data pair from the positive example set identification unit 103. The characteristic quantity calculation unit 104 includes a function to calculate, for each expression in the text of each piece of the analysis target data, a characteristic quantity for the expression based on a statistical difference in appearances in all the text sets and the positive example text sets. The characteristic quantity calculation unit 104 includes a function to extract plural pairs of the expression and the characteristic quantity calculated for each piece of the analysis target data. And the characteristic quantity calculation unit 104 includes a function to output the plural pairs of the expression extracted and the characteristic quantity calculated for each piece of the analysis target data as a characteristic expression list, with each set of the analysis target data pair and the analysis viewpoint, to the characteristic expression ranking unit 105.

The characteristic expression ranking unit 105 is realized, specifically, by a CPU of an information processing device which operates according to a program. The characteristic expression ranking unit 105 includes a function to input each set of the analysis target data pair and the analysis viewpoint from the characteristic quantity calculation unit 104 with the characteristic expression lists of respective pieces of the analysis target data included in the analysis target data pair. The characteristic expression ranking unit 105 includes a function to provide characteristic expression ranks which are ranks in descending order of a value of the characteristic quantity for all the characteristic expressions in each of the characteristic expression list. The characteristic expression ranking unit 105 includes a function to output each set of the analysis target data pair and the analysis viewpoint with the characteristic expression lists and the characteristic expression ranks of respective pieces of the analysis target data included in the analysis target data pair to the characteristic expression rank variation evaluation unit 106.

The characteristic expression rank variation evaluation unit 106 is realized, specifically, by a CPU of an information processing device which operates according to a program. The characteristic expression rank variation evaluation unit 106 includes a function to input each set of the analysis target data pair and the analysis viewpoint with the characteristic expression lists and the characteristic expression ranks of respective pieces of the analysis target data included in the analysis target data pair from the characteristic expression ranking unit 105. The characteristic expression rank variation evaluation unit 106 includes a function to obtain a characteristic expression rank variation which is a degree of a statistical variation of the characteristic expression rank for each expression, for both pieces of the analysis target data, based on the characteristic expression lists and the characteristic expression ranks of both pieces of the analysis target data. The characteristic expression rank variation evaluation unit 106 includes a function to output each set of the analysis target data pair and the analysis viewpoint with the characteristic expression lists and the characteristic expression rank variation of both pieces of the analysis target data included in the analysis target data pair to the analysis viewpoint generation unit 102.

The input unit 110 is realized by, specifically, an input device such as a keyboard and a mouse. The input unit 110 includes a function to input analysis target data and so on according to analyst's operation.

The output unit 120 is realized by, specifically, a display device such as a display unit. The output unit 120 includes a function to display data which the analysis target data pair search unit 101 outputted on the display unit. Note that, although data is displayed on the display unit in this exemplary embodiment, the output unit 120 may output the data to a file.

Next, whole operation of the exemplary embodiment of the present invention will be described with reference to FIG. 3 and FIG. 4. FIG. 4 is a flow chart showing a processing example which the text mining system according to this exemplary embodiment executes.

When an analyst performs input operation using the input unit 110 in order to analyze plural pieces of data, the input unit 110 inputs plural pieces of analysis target data according to the analyst's operation. The analysis target data pair search unit 101 inputs the plural pieces of analysis target data from the input unit 110. The analysis target data pair search unit 101 generates plural analysis target data pairs including two analysis target data among the plural pieces of the analysis target data inputted from the input unit 110. The analysis target data pair search unit 101 outputs the plural analysis target data pairs generated to the analysis viewpoint generation unit 102 (Step A1 of FIG. 4).

Next, the analysis viewpoint generation unit 102 inputs the plural analysis target data pairs from the analysis target data pair search unit 101. The analysis viewpoint generation unit 102 generates plural sets of the analysis target data pair and an analysis viewpoint by searching for a common analysis viewpoint which can be set for both pieces of the analysis target data of each of the plural analysis target data pairs inputted from the analysis target data pair search unit 101. The analysis viewpoint generation unit 102 outputs the plural sets of the analysis target data pair and the analysis viewpoint generated to the positive example set identification unit 103 (Step A2).

Next, the positive example set identification units 103 inputs the plural sets of the analysis target data pair and the analysis viewpoint from the analysis viewpoint generation unit 102. The positive example set identification unit 103 identifies positive example sets of respective pieces of the analysis target data included in the analysis target data pair for the analysis viewpoint, for each set of the analysis target data pair and the analysis viewpoint. The positive example set identification unit 103 outputs each set of the analysis target data pair and the analysis viewpoint with all the text sets and the identified positive example text sets of respective pieces of the analysis target data included in the analysis target data pair to the characteristic quantity calculation unit 104 (Step A3).

Next, the characteristic quantity calculation unit 104 inputs each set of the analysis target data pair and the analysis viewpoint with all the text sets and the positive example text sets of respective pieces of the analysis target data included in the analysis target data pair from the positive example set identification unit 103. The characteristic quantity calculation unit 104 calculates, for each expression in the text of each piece of the analysis target data, a characteristic quantity for the expression based on a statistical difference in appearances in all the text sets and the positive example text sets. The characteristic quantity calculation unit 104 extracts plural pairs of the expression and the characteristic quantity for each piece of the analysis target data. The characteristic quantity calculation unit 104 outputs the plural pairs of the expression extracted and the characteristic quantity calculated for each piece of the analysis target data as a characteristic expression list, with each set of the analysis target data pair and the analysis viewpoint, to the characteristic expression ranking unit 105 (Step A4).

Next, the characteristic expression ranking unit 105 inputs each set of the analysis target data pair and the analysis viewpoint with the characteristic expression lists of respective pieces of the analysis target data included in the analysis target data pair from the characteristic quantity calculation unit 104. The characteristic expression ranking unit 105 provides characteristic expression ranks which are ranks in descending order of the characteristic quantity for all the characteristic expressions in each of the characteristic expression lists. The characteristic expression ranking unit 105 outputs each set of the analysis target data pair and the analysis viewpoint with the characteristic expression lists and the characteristic expression ranks of respective pieces of the analysis target data included in the analysis target data pair to the characteristic expression rank variation evaluation unit 106 (step A5).

Next, the characteristic expression rank variation evaluation unit 106 inputs each set of the analysis target data pair and the analysis viewpoint with the characteristic expression lists and the characteristic expression ranks of respective pieces of the analysis target data included in the analysis target data pair from the characteristic expression ranking unit 105. The characteristic expression rank variation evaluation unit 106 obtains a characteristic expression rank variation which is a degree of a statistical variation of the characteristic expression rank for each expression, for both pieces of the analysis target data, based on the characteristic expression lists and the characteristic expression ranks of respective pieces of the analysis target data. The characteristic expression rank variation evaluation unit 106 outputs each set of the analysis target data pair and the analysis viewpoint with the characteristic expression lists of respective pieces of the analysis target data included in the analysis target data pair and the characteristic expression rank variation to the analysis viewpoint generation unit 102 (Step A6).

Next, the analysis viewpoint generation unit 102 inputs plural sets of the analysis target data pair and the analysis viewpoint with the characteristic expression lists of respective pieces of the analysis target data included in the analysis target data pair and the characteristic expression rank variation from the characteristic expression rank variation evaluation unit 106. The analysis viewpoint generation unit 102 extracts the set of the analysis target data pair and the analysis viewpoint with a large value of the characteristic expression rank variation. The analysis viewpoint generation unit 102 outputs the extracted set of the analysis target data pair and the analysis viewpoint with the characteristic expression lists of respective pieces of the analysis target data included in the analysis target data pair to the analysis target data pair search unit 101 (Step A7).

Finally, the analysis target data pair search units 101 inputs plural sets of the analysis target data pair and the analysis viewpoint with a large characteristic expression rank variation, with the characteristic expression lists of respective pieces of the analysis target data included in the analysis target data pair, from the analysis viewpoint generation unit 102. The analysis target data pair search unit 101 judges these analysis target data pairs as the analysis target data pair with a difference. The analysis target data pair search unit 101 outputs the characteristic expression lists extracted from respective pieces of analysis target data of the analysis target data pair with the difference to the output unit 120 as a mining result (Step A8). The output unit 120, for example, displays the mining result outputted by the analysis target data set search unit 101 on the display unit.

Next, operation of the text mining system according to this exemplary embodiment will be described using a specific example. Here, it is supposed that a threshold value, an analysis viewpoint, and data showing their correspondence relationships used in the description below are set by an analyst, for example, in advance. First, operation in Step A1 of FIG. 4 will be described.

The analysis target data pair search unit 101 inputs plural pieces of analysis target data from the input unit 110. Specifically, it is supposed that a total of 10 pieces of analysis target data acquired by a plurality of means such as calls at a call center, answer history, e-mails, a word of mouth communication site on the Web, bulletin boards and questionnaires are inputted to the analysis target data pair search unit 101. These pieces of analysis target data are described hereafter as "call", "history", "mail", "site", "board A", "board B", "board C", "board D", "board E" and "board F". Note that, board A means bulletin board A. Similarly, board B, board C, board D, board E and board F mean bulletin board B, bulletin board C, bulletin board D, bulletin board E and bulletin board F, respectively. Here, for example, the analysis target data "board A" is, specifically, a text set to which an attribute value as shown in FIG. 5 is given. Then, the analysis target data pair search unit 101 generates plural pieces of analysis target data pairs as shown in FIG. 6 from the plural pieces of analysis target data inputted.

Here, the analysis target data pair search unit 101 may judge, for each of these plural analysis target data pairs, whether there is a commonality in contents between two pieces of analysis target data included in the analysis target data pair. Specifically, when two pieces of analysis target data are D1 and D2, in case the overlap of expressions of both of them shown in equation (1) exceeds a predetermined threshold value, the analysis target data pair search unit 101 judges that there is a commonality in the contents of both of them. And the analysis target data pair search unit 101 generates only the analysis target data pair including two pieces of analysis target data for which it is judged that there is a commonality. Note that, "number of differences" represents the number of kinds of words.

$$(\text{Overlap of expressions of } D_1 \text{ and } D_2) = \frac{\left(\begin{array}{c}\text{Number of differences of all words}\\ \text{included in both of } D_1 \text{ and } D_2\end{array}\right)}{\left(\begin{array}{c}\text{Number of differences of all words}\\ \text{included in either or both of } D_1 \text{ and } D_2\end{array}\right)} \quad \text{Equation (1)}$$

The analysis target data pair search unit 101 outputs the plural analysis target data pairs generated by the method mentioned above to the analysis viewpoint generation unit 102.

Next, operation in Step A2 will be described. The analysis viewpoint generation unit 102 inputs the plural analysis target data pairs from the analysis target data pair search unit 101. Here, in case the analysis target data pair inputted from the analysis target data pair search unit 101 includes the analysis target data "board A" and the analysis target data "board B", the analysis viewpoint generation unit 102 searches for a common analysis viewpoint which can be set for both pieces of the analysis target data.

Here, specifically, it is supposed that the analysis viewpoint is given by a conditional expression for a range of attribute value of analysis target data. Note that, even in case the attribute value is not given to the analysis target data in advance, it is possible for the text mining system to set the analysis viewpoint by generating the attribute value from text thereof.

For example, an example of the analysis viewpoints which are given to the analysis target data "board A" is shown in FIG. 7. Here, the analysis viewpoint of ID=1 shows that the value for the attribute "evaluation" is 1, 2 or 3, and the value for the attribute "age" is either one from 10 to 19.

Here, it is supposed that the analysis viewpoints as shown in FIG. 8 are also given similarly to the analysis target data "board B", and further, correspondence relationships as shown in FIG. 9 are given between both of the analysis viewpoints. Then, for example, for the analysis target data "board A" and the analysis target data "board B", the analysis viewpoint generation unit 102 judges that the analysis viewpoints "evaluation=[1, 2, 3] & age=[10-19]" and "evaluation=[D,E] & age=[10-19]" are a common analysis viewpoint.

By the method mentioned above, the analysis viewpoint generation unit 102 searches for a plurality of common analysis viewpoints for each analysis target data pair and outputs the obtained set of the analysis target data pair and the analysis viewpoint to the positive example set identification unit 103.

Here, when no analysis viewpoints are obtained for an analysis target data pair as a result of the search of the common analysis viewpoint, the analysis viewpoint generation unit 102 controls in such a way that the analysis target data pair is not outputted to the positive example set identification unit 103. By this control, the positive example set identification unit 103 can decide two pieces of analysis target data should be compared and analyzed with priority from the analysis target data pair including one or more common analysis viewpoints.

Next, operation in Step A3 will be described. The positive example set identification unit 103 inputs the plural sets of the analysis target data pair and the analysis viewpoint from the analysis viewpoint generation unit 102.

Here, it is supposed that one of the inputted sets of the analysis target data pair and the analysis viewpoint is the set of the analysis target data pair including the analysis target data "board A" and the analysis target data "board B" and corresponding analysis viewpoint "evaluation=[1, 2, 3] & age=[30-39]", "evaluation=[D, E] & age=[30-39]". In this case, the positive example set identification unit 103 can obtain a positive example text set by extracting a case which satisfies a positive example set for the analysis viewpoint in the analysis target data "board A".

Specifically, the positive example set identification unit 103 extracts the case which satisfies the condition that an attribute value of the attribute "evaluation" is either one of 1, 2 and 3, and an attribute value of the attribute "age" is either one of values from 30 to 39. In the cases shown in FIG. 5, the positive example set identification unit 103 extracts ID=3 which satisfies the condition as the positive example.

The positive example set identification unit 103 extracts the positive example set for each analysis target data of each analysis target data pair by the method mentioned above. The positive example set identification unit 103 outputs each set of the analysis target data pair and the analysis viewpoint with all the text sets and the extracted positive example text sets of individual pieces of the analysis target data included in the analysis target data pair to the characteristic quantity calculation unit 104.

Here, when the number of the positive example sets extracted from each piece of the analysis target data based on the analysis viewpoint does not exceed a predetermined value, the positive example set identification unit 103 controls in such a way that that the set of the analysis target data pair and the common analysis viewpoint, including the analysis target data and the analysis viewpoint, are not outputted to the characteristic quantity calculation unit 104. By this control, the characteristic quantity calculation unit 104 can decide two pieces of analysis target data should be compared and analyzed with priority from the analysis target data pair for which the number of the positive examples, based on the common analysis viewpoint, in each analysis target data is equal to or greater than the predetermined number.

Next, operation in Step A4 will be described. The characteristic quantity calculation unit 104 inputs each set of the analysis target data pair and the analysis viewpoint with all the text sets and the positive example text sets of individual pieces of the analysis target data included in the analysis target data pair from the positive example set identification unit 103. The characteristic quantity calculation unit 104 extracts expressions from the text of each of the analysis target data.

Specifically, the characteristic quantity calculation unit 104 can extract an independent word obtained based on a result of morphological analysis as an expression. For example, in case that the expressions are extracted from the text of the analysis target data "board A", the characteristic quantity calculation unit 104 extracts "fragrance", "good" and "use" from the sentence "If fragrance were good, I would use it." as an expression.

Here, it is supposed that the analysis target data "board A" includes 1,452 text sets, the expression "fragrance" appears total of 51 times in the text sets, 305 positive example sets for the analysis viewpoint "evaluation=[1, 2, 3] & age=[30-39]" are included in the text sets, and the expression "fragrance" appears 34 times in the positive example sets. In this case, the characteristic quantity calculation unit 104 calculates a characteristic quantity from the statistical difference of their appearances.

For example, in case a chi-square distribution is used as a characteristic quantity, the characteristic quantity calculation unit 104 can calculate the characteristic quantity using equations (2) to (4) shown below. Note that, the characteristic quantity calculation unit 104 can also calculate the characteristic quantity using various measures concerning correlation such as stochastic complexity and extended stochastic complexity in addition to the chi-square distribution.

$$x^2 = \frac{N(O_{11} - E_{11})^2}{E_{11} E_{22}} \quad \text{Equation (2)}$$

Wherein, $$E_{11} = \frac{R_1 C_1}{N} = \frac{(O_{11} + O_{12}) \cdot (O_{11} + O_{21})}{N} \quad \text{Equation (3)}$$

$$E_{22} = \frac{R_2 C_2}{N} = \frac{(O_{21} + O_{22}) \cdot (O_{12} + O_{22})}{N} \quad \text{Equation (4)}$$

In the example of the expression "fragrance" in the analysis target data acquired from the bulletin board A mentioned above, because $N=1452$, $O_{11}=34$, $O_{12}=51-34=17$, $O_{21}=305-34=271$ and $O_{22}=1452-305-51+34=1130$, the characteristic quantity calculation unit 104 calculates a value of the chi-square as shown in equations (5) to (7).

$$E_{11} = \frac{(34 + 17) \cdot (34 + 271)}{1452} = 10.713 \quad \text{Equation (5)}$$

$$E_{22} = \frac{(271 + 1130) \cdot (17 + 1130)}{1452} = 1106.8 \quad \text{Equation (6)}$$

$$x^2 = \frac{1452 \cdot (34 - 10.713)^2}{10.713 \cdot 1106.8} = 66.407 \quad \text{Equation (7)}$$

Similarly, the characteristic quantity calculation unit 104 obtains the characteristic quantities for all expressions extracted from the text sets in each analysis target data. The characteristic quantity calculation units 104 extract a plurality of sets of the expression and the characteristic quantity for each piece of analysis target data. The characteristic quantity calculation unit 104 outputs the plural pairs of the expression extracted and the characteristic quantity calculated for each piece of analysis target data as a characteristic expression list, with each set of the analysis target data pair and the analysis viewpoint, to the characteristic expression ranking unit 105.

Next, operation in step A5 will be described. The characteristic expression ranking unit 105 inputs each set the analysis target data pair and the analysis viewpoint with the characteristic expression lists of respective pieces of the analysis target data included in the analysis target data pair from the characteristic quantity calculation unit 104. The characteristic expression ranking unit 105 provides characteristic expression ranks which are ranks in descending order of the characteristic quantity for all the characteristic expressions in each characteristic expression list.

As a result, the characteristic expression ranking unit 105 generates, for example, from the characteristic expression list obtained from the analysis target data "board A" based on the analysis viewpoint "evaluation=[1, 2, 3] & age=[30-39]", a characteristic expression list for which characteristic expression ranks are provided as shown in FIG. 10.

After the characteristic expression ranking unit 105 generates the characteristic expression list by the method mentioned above, the characteristic expression ranking unit 105 outputs each set of the analysis target data pair and the analysis viewpoint with the characteristic expression lists of respective pieces of the analysis target data included in the analysis target data pair and the characteristic expression ranks of each thereof to the characteristic expression rank variation evaluation unit 106.

Next, operation in Step A6 will be described. The characteristic expression rank variation evaluation unit 106 inputs each set of the analysis target data pair and the analysis viewpoint with the characteristic expression lists of respective pieces of the analysis target data included in the analysis target data pair and the characteristic expression ranks of each thereof from the characteristic expression ranking unit 105. The characteristic expression rank variation evaluation unit 106 obtains a characteristic expression rank variation which is a degree of a statistical variation of the characteristic expression rank for each expression, for both pieces of the analysis target data, based on the characteristic expression lists of respective pieces of the analysis target data and the characteristic expression ranks of each thereof.

Here, the characteristic expression rank variation evaluation unit 106 can obtain the characteristic expression rank variation as a mean value of differences in the characteristic expression ranks of respective characteristic expressions between characteristic expression lists of both pieces of the analysis target data included in the analysis target data pair.

Specifically, the characteristic expression rank variation evaluation unit 106 obtains a relative characteristic expression rank for an expression x in the analysis target data Di using Equation (8). In this case, the characteristic expression rank variation evaluation unit 106 can obtain the difference in the characteristic expression ranks of the expression x between the analysis target data Di and Dj as $\Delta S_{i,j}(x)=S_i(x)-S_j(x)$. The characteristic expression rank variation evaluation unit 106 can calculate the characteristic expression rank variation by calculating a square of the difference, an average of the squares for expressions $\{x\}$, and a root of the average (root mean square) (Equation (9)). Note that, in case that there exists no expression x in the analysis target data Di, the characteristic expression rank variation evaluation unit 106 sets $S_i(x)=0$.

$$S_i(x) = \log\frac{n_i(x)}{r_i(x)} \quad \text{Equation (8)}$$

$$\sqrt{\overline{(\Delta S_{ij})^2}} \quad \text{Equation (9)}$$

The characteristic expression rank variation evaluation unit 106 outputs the characteristic expression lists of respective pieces of the analysis target data included in the analysis target data pair and the characteristic expression rank variation calculated by the method mentioned above, with each set of the analysis target data pair and the analysis viewpoint, to the analysis viewpoint generation unit 102.

Next, operation in Step A7 will be described. The analysis viewpoint generation unit 102 inputs plural sets of the analysis target data pair and the analysis viewpoint with the characteristic expression lists of respective pieces of the analysis target data included in the analysis target data pair and the characteristic expression rank variation from the characteristic expression rank variation evaluation unit 106.

Here, the analysis viewpoint generation unit 102 extracts, from the sets of the analysis target data pair and the analysis viewpoint, the set with the characteristic expression rank variation exceeding a predetermined value. The analysis viewpoint generation unit 102 outputs the extracted sets of the analysis target data pair and the analysis viewpoint with the characteristic expression lists of respective pieces of the analysis target data included in the analysis target data pair to the analysis target data pair search unit 101.

Finally, operation in Step A8 will be described. The analysis target data pair search units 101 inputs plural sets of the analysis target data pair and the analysis viewpoint with a large characteristic expression rank variation, with the characteristic expression lists of respective pieces of the analysis target data included in the analysis target data pair, from the analysis viewpoint generation unit 102.

The analysis target data pair search unit 101 judges that these analysis target data pairs as an analysis target data pair including two pieces of analysis target data should be compared and analyzed with priority. The analysis target data pair search unit 101 outputs the individual characteristic expression lists extracted from respective pieces of the analysis target data of the analysis target data pair to the output unit 120 as a mining result. After that, the output unit 120, for example, displays the mining result outputted by the analysis target data set search unit 104 on a display unit.

From those described above, it can be said that the present invention includes the following means for solving the problems. A text mining system according to the present invention includes a data processing device (computer 100), an output device (output unit 120) and an input device (input unit 110). Also, the data processing device (computer 100) includes an analysis target data search unit, an analysis viewpoint generation unit, a positive example set identification unit, a characteristic quantity calculation unit, a characteristic expression ranking unit and a characteristic expression rank variation evaluation unit. The data processing device (computer 100) searches plural pieces of analysis target data which are acquired by different means for a set of an analysis target data pair and an analysis viewpoint with a large characteristic expression rank variation and outputs characteristic expression lists of the analysis target data pair as a mining result.

The text mining system, with a configuration as described above, searches for the set of the analysis target data pair and the analysis viewpoint with a large characteristic expression rank variation as the analysis target data pair and the analysis viewpoint including a difference should be compared and analyzed with priority. The text mining system can achieve the object of the present invention by outputting the characteristic expression lists extracted from the analysis target data pair based on the analysis viewpoint as the mining result.

The advantageous effect of the present invention is that it is possible to suppress an increase of a cost of analyzing by an analyst, in case plural pieces of analysis target data are analyzed and parts of these pieces of analysis target data including a difference should be compared and analyzed with priority are analyzed, exhaustively.

The reason is as follows. The text mining system searches for a set of an analysis target data pair and an analysis viewpoint with a large rank variation of expression between characteristic expression lists as a set of an analysis target data pair and an analysis viewpoint with a difference should be compared and analyzed with priority. And the text mining system outputs characteristic expressions extracted from the analysis target data pair based on the analysis viewpoint as a mining result. Therefore, the text mining system can reduce the cost of exhaustively analyzing an analysis target data pair with a difference.

Figure 1:
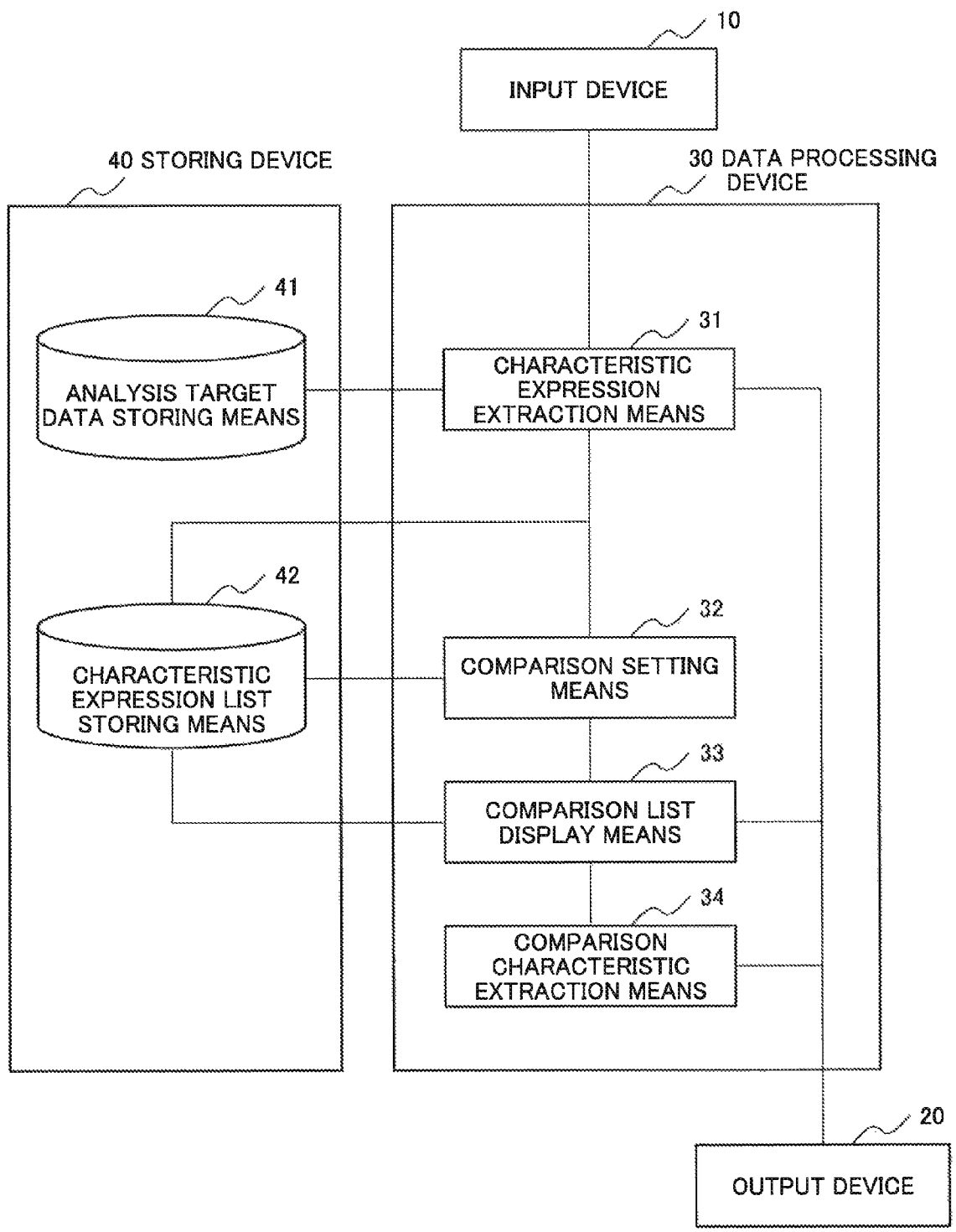
FIG. 1 A block diagram showing an exemplary configuration of a text mining system.
Figure 2:
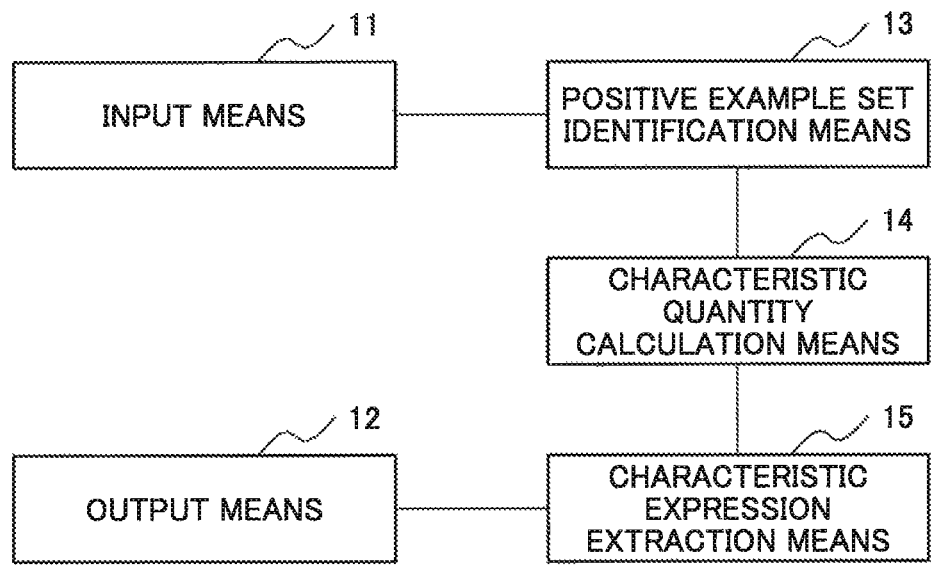
FIG. 2 A block diagram showing another exemplary configuration of a text mining system.

In a related technology, in case text mining is performed, there is a case that a system, which is configured so that a positive example set for an analysis viewpoint is identified from a text set first and the text mining is performed using the identified positive example set, is used. Hereinafter, an example of the text mining system which identifies the positive example set and performs the text mining will be described. As shown in FIG. 2, the text mining system includes an input means 11, an output means 12, a positive example set identification means 13, a characteristic quantity calculation means 14 and a characteristic expression extraction means 15.

The text mining system with such a configuration operates as follows. That is, when text sets acquired from a channel and an analysis viewpoint are inputted from the input means 11, the positive example set identification means 13 identifies a positive example set for the analysis viewpoint in the text sets. The characteristic quantity calculation means 14 calculates for each expression in the texts, a characteristic quantity for the expression based on a statistical difference in appearances in the whole text sets and the positive example set. Next, the characteristic expression extraction means 15 extracts an expression with a large characteristic quantity as a characteristic expression. And the output means outputs the characteristic expression extracted by the characteristic expression extraction means.

The problem of the system shown in FIG. 2 mentioned above is as follows. In case plural pieces of analysis target data are analyzed, parts of these pieces of analysis target data including a difference which should be compared and analyzed with priority may need to be analyzed, exhaustively. In this case, there is a problem that time, labor and so on necessary for an analysis by an analyst (a cost of analyzing) becomes remarkably large in each of the systems mentioned above.

The reasons are as follows. The first reason is, in order for an analyst to analyze the parts of plural pieces of analysis target data including a difference which should be compared and analyzed with priority, exhaustively, it is necessary to compare and analyze all the analysis target data pairs including two different pieces of analysis target data. Further, in the comparison analysis of each analysis target data pair, it is necessary to set all of common viewpoints of analysis to both pieces of the analysis target data which form the pair and to analyze exhaustively whether a difference is caused for each of the viewpoints. The second reason is that a cost of analyzing increases remarkably as the number of combinations of the analysis target data pairs and the viewpoints of analysis is increased.

On the other hand, according to the present invention, in case plural pieces of analysis target data is analyzed, it is possible to analyze parts of these pieces of analysis target data including a difference which should be compared and analyzed with priority, exhaustively, with suppressing the cost of analyzing by an analyst.

Figure 11:
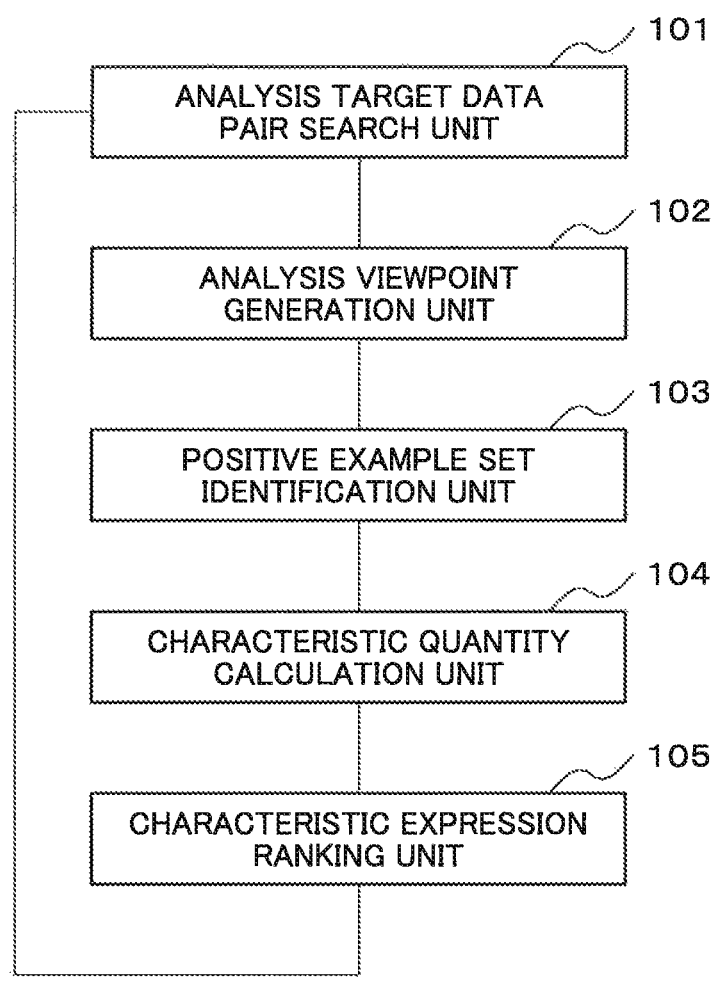
FIG. 11 A function block diagram showing an exemplary configuration of the text mining system with minimum functions.

Next, a minimum configuration of the text mining system according to the present invention will be described. FIG. 11 is a block diagram showing a minimum exemplary configuration of the text mining system. As shown in FIG. 11, the text mining system includes, as minimum components, an analysis target data pair search unit 101, an analysis viewpoint generation unit 102, a positive example set identification unit 103, a characteristic quantity calculation unit 104 and a characteristic expression ranking unit 105.

In the text mining system of the minimum configuration shown in FIG. 11, the analysis target data pair search unit 101 judges whether there is a commonality in contents between two pieces of inputted analysis target data. The analysis viewpoint generation unit 102 generates a common analysis viewpoint in such a way that, in comparison analysis of the two pieces of the analysis target data for which it is judged that there is a commonality, different characteristic expression sets from the two pieces of the analysis target data are obtained. The positive example set identification unit 103 identifies a positive example set in the analysis target data based on the generated analysis viewpoint. The characteristic quantity calculation unit 104 calculates a characteristic quantity which shows a degree of characterizing the positive example set for each expression in the analysis target data. The characteristic expression ranking unit 105 extracts expressions with a large characteristic quantity based on the calculated characteristic quantity as characteristic expressions and provides characteristic expression ranks in descending order of the characteristic quantity for the extracted characteristic expressions. The analysis target data pair search unit 101 outputs the analysis viewpoint with a large difference in ranks of the characteristic expressions between pieces of the analysis target data as the analysis viewpoint based on which comparison analysis should be performed with priority.

Accordingly, the text mining system of the minimum configuration can suppress increase of the cost of analyzing by an analyst, in case that plural pieces of analysis target data are analyzed and parts of these pieces of analysis target data including a difference should be compared and analyzed with priority are analyzed, exhaustively.

Further, in this exemplary embodiment, characteristic configurations of a text mining system as shown in (1)-(8) described below are shown.

(1) A text mining system is characterized by including an analysis target data pair search unit (for example, realized by the analysis target data pair search unit 101) which judges whether there is a commonality in contents between two pieces of inputted analysis target data, an analysis viewpoint generation unit (for example, realized by the analysis viewpoint generation unit 102) which generates a common analysis viewpoint in such a way that, in comparison analysis of the two pieces of the analysis target data for which it is judged that there is a commonality, different characteristic expression sets from the two pieces of the analysis target data are obtained, a positive example set identification unit (for example, realized by the positive example set identification unit 103) which, based on the analysis viewpoint generated by the analysis viewpoint generation unit, identifies a positive example set in the analysis target data, a characteristic quantity calculation unit (for example, realized by the characteristic quantity calculation unit 104) which calculates a characteristic quantity showing a degree of characterizing the positive example set for each of expressions in the analysis target data and a characteristic expression ranking unit (for example, realized by the characteristic expression ranking unit 105) which, based on the characteristic quantity calculated by the characteristic quantity calculation unit, extracts expressions with a large characteristic quantity as characteristic expressions and provides characteristic expression ranks in descending order of the characteristic quantity for the characteristic expressions, wherein the analysis target data pair search unit outputs the analysis viewpoint with a large difference in ranks of each of the characteristic expressions between pieces of the analysis target data as the analysis viewpoint based on which comparison analysis should be performed with priority.

(2) In the text mining system, the analysis target data pair search unit may be configured so as to input three or more pieces of analysis target data, search the analysis target data for two pieces of analysis target data with a commonality in contents as an analysis target data pair, and output the analysis viewpoint with a large difference in ranks of each of the characteristic expressions as the analysis viewpoint based on which comparison analysis should be performed with priority for each analysis target data pair.

(3) In the text mining system, each piece of analysis target data is a text set collected by different means (for example, call voice, answer history at a call center, e-mails, bulletin boards on the web, questionnaires and so on) and it may be configured so that attribute information (for example, date and time of reply, respondent's information and so on) is given to each text of the text set as an attribute value or is extracted from the text itself.

(4) In the text mining system, the analysis target data pair search unit may be configured so as to judge that a large difference in ranks of the characteristic expressions between pieces of analysis target data is caused in case that a mean value of a difference (calculated by the characteristic expression rank variation evaluation unit 106, for example) in the ranks of each of the characteristic expressions common to two characteristic expression lists extracted from the respective pieces of analysis target data is greater than a predetermined value.

(5) In the text mining system, the analysis viewpoint generation unit may be configured so as to set an identical analysis viewpoint in two pieces of analysis target data or a predetermined analysis viewpoint with a correspondence relationship (a correspondence relationship shown in FIG. 9, for example) between the two pieces of analysis target data, among analysis viewpoints of respective pieces of analysis target data, to the analysis viewpoint common to the two pieces of analysis target data.

(6) In the text mining system, the positive example set identification unit may be configured so as to output the positive example sets in case the number of the identified positive example sets is equal to or greater than a predetermined amount after identifying the positive example sets matching the common analysis viewpoint from the two analysis target data.

(7) In the text mining system, the analysis viewpoint generation unit may be configured so as to generate information indicating a condition of a range of value that an attribute can take, as the analysis viewpoint, for the attribute which is given to each piece of text in the text set or extracted from each piece of text (for example, date and time of reply, respondent's information and so on) in each piece of the analysis target data.

(8) In the text mining system, the analysis target data pair search unit may be configured so as to judge, concerning a commonality in contents of two analysis target data, that there is a commonality in contents of the two pieces of analysis target data in case a degree of overlap of the expression set included in the text sets in the two pieces of the analysis target data (for example, a value obtained by Equation (1)) is greater than a predetermined value.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-294763, filed on Dec. 25, 2009, the disclosure of which is incorporated herein in its entirety by reference.

INDUSTRIAL APPLICABILITY

The present invention can be applied to an analysis of customer request and a problem of product services by analyzing a difference among pieces of analysis target data exhaustively using text mining on plural pieces of analysis target data which are acquired by different means such as calls at a contact center of an enterprise, e-mails, consumer's bulletin board sites (Web) concerning product services and questionnaire.

REFERENCE SIGNS LIST

100 Computer
101 Analysis target data pair search unit
102 Analysis viewpoint generation unit
103 Positive example set identification unit
104 Characteristic quantity calculation unit
105 Characteristic expression ranking unit
106 Characteristic expression rank variation evaluation unit
110 Input unit
120 Output unit

What is claimed is:

1. A text mining system comprising:
an analysis target data pair search processor which judges whether there is a commonality in expressions among pieces of text data, said pieces of text data being included in plural pieces of analysis target data, respectively;
an analysis viewpoint generation processor which generates a plurality of common analysis viewpoints which is a condition to extract an expression from each of said pieces of analysis target data with said commonality;
a positive example set identification processor which identifies, for each of said plurality of common analysis viewpoints, one or more positive example sets each including an expression matching a corresponding one of said plurality of common analysis viewpoints in each of said pieces of analysis target data with said commonality;
a characteristic quantity calculation processor which calculates, for each of said plurality of common analysis viewpoints, characteristic quantity showing a degree of characteristic expression of said one or more positive example sets for each of expressions in each of said pieces of analysis target data with said commonality; and
a characteristic expression ranking processor which provides, for each of said plurality of common analysis viewpoints, ranks for said expressions in descending order of said calculated characteristic quantity, wherein
said analysis target data pair search processor extracts a common analysis viewpoint for said pieces of analysis target data with said commonality from said plurality of common analysis viewpoints in case that a difference in ranks provided for each of said expressions is equal to or greater than a predetermined threshold for said common analysis viewpoint.

2. The text mining system according to claim 1, wherein said analysis target data pair search processor inputs three or more pieces of analysis target data, searches said three or more pieces of analysis target data for two pieces of analysis target data with said commonality in expressions as an analysis target data pair, and, for each analysis target data pair, extracts said common analysis viewpoint for said two pieces of analysis target data with said commonality in case that a difference in ranks provided for each of said expressions between said two pieces of analysis target data is equal to or greater than a predetermined threshold for said common analysis viewpoint.

3. The text mining system according to claim 1, wherein, in each of said pieces of analysis target data, attribute information showing an attribute of an expression in each of said pieces of text data is associated with an expression as an attribute value or is extracted from each of said pieces of text data.

4. The text mining system according to claim 1, wherein said analysis target data pair search processor extracts said common analysis viewpoint for said pieces of analysis target data with said commonality in case that a mean value of a difference in ranks of each of said expressions common to lists of said expressions extracted from respective said pieces of analysis target data with a commonality is greater than said predetermined threshold for said common analysis viewpoint.

5. The text mining system according to claim 1, wherein said analysis viewpoint generation processor identifies, among analysis viewpoints of respective said pieces of analysis target data with said commonality, an identical analysis viewpoint among said pieces of analysis target data with said commonality or an analysis viewpoint with a predetermined relationship among said pieces of analysis target data with said commonality as each of said plurality of common analysis viewpoints for said pieces of analysis target data with said commonality.

6. The text mining system according to claim 1, wherein said positive example set identification processor outputs said one or more positive example sets in case that the number of said identified one or more positive example sets is equal to or greater than a predetermined number after identifying said one or more positive example sets matching said corresponding one of said plurality of common analysis viewpoints in each of said pieces of analysis target data with said commonality.

7. The text mining system according to claim 1, wherein said analysis viewpoint generation processor generates information indicating a condition of a range of value for an attribute shown by attribute information as each of said plurality of common analysis viewpoints, said attribute information being associated with each of said pieces of text data or being extracted from each of said pieces of text data in each of said pieces of analysis target data with said commonality.

8. The text mining system according to claim 1, wherein said analysis target data pair search processor judges that there is said commonality among said plural pieces of analysis target data in case that a degree of overlap of each expression included in said pieces of text data in said pieces of analysis target data is greater than a predetermined threshold.

9. A text mining method performed by at least one processor, the method comprising:
judging whether there is a commonality in expressions among pieces of text data, said pieces of text data being included in plural pieces of analysis target data, respectively;
generating a plurality of common analysis viewpoints which is a condition to extract an expression from each of said pieces of analysis target data with said commonality
identifying, for each of said plurality of common analysis viewpoints, one or more positive example sets each including an expression matching a corresponding one of said plurality of common analysis viewpoints in each of said pieces of analysis target data with said commonality;
calculating, for each of said plurality of common analysis viewpoints, characteristic quantity showing a degree of characteristic expression of said one or more positive example sets for each of expressions in each of said pieces of analysis target data with said commonality;
providing, for each of said plurality of common analysis viewpoints, ranks for said expressions in descending order of said calculated characteristic quantity; and
extracting a common analysis viewpoint for said pieces of analysis target data with said commonality from said plurality of common analysis viewpoints in case that a difference in ranks provided for each of said expressions is equal to or greater than a predetermined threshold for said common analysis viewpoint.

10. A non-transitory computer readable storage medium having recorded thereon a program for text mining, the program when executed by a processor causing a computer to perform the text mining, comprising:
judging whether there is a commonality in expressions among pieces of text data, said pieces of text data being included in plural pieces of analysis target data, respectively;
generating a plurality of common analysis viewpoints which is a condition to extract an expression from each of said pieces of analysis target data with said commonality;
identifying, for each of said plurality of common analysis viewpoints, one or more positive example sets each including an expression matching a corresponding one of said plurality of common analysis viewpoints in each of said pieces of analysis target data with said commonality;
calculating, for each of said plurality of common analysis viewpoints, characteristic quantity showing a degree of characteristic expression of said one or more positive example sets for each of expressions in each of said pieces of analysis target data with said commonality;
providing, for each of said plurality of common analysis viewpoints, ranks for said expressions in descending order of said calculated characteristic quantity; and
extracting a common analysis viewpoint for said pieces of analysis target data with said commonality from said plurality of common lysis viewpoints in case that a difference in ranks provided for each of said expressions is equal to or greater than a predetermined threshold for said common analysis viewpoint.

11. A text mining system, the system implemented by at least one processor, the system comprising:
analysis target data pair search processor configured to judge whether there is a commonality in expressions among pieces of text data, said pieces of text data being included in plural pieces of analysis target data, respectively;
analysis viewpoint generation processor configured to generate a plurality of common analysis viewpoints which is a condition to extract an expression from each of said pieces of analysis target data with said commonality;
positive example set identification processor configured to identify, for each of said plurality of common analysis viewpoints, one or more positive example sets each including an expression matching a corresponding one of said plurality of common analysis viewpoints in each of said pieces of analysis target data with said commonality;
characteristic quantity calculation configured to calculate, for each of said plurality of common analysis viewpoints, characteristic quantity showing a degree of characteristic expression of said one or more positive example sets for each of expressions in each of said pieces of analysis target data with said commonality; and
characteristic expression ranking processor configured to provide, for each of said plurality of common analysis viewpoints, ranks for said expressions in descending order of said calculated characteristic quantity, wherein
said analysis target data pair search processor is configured to extract a common analysis viewpoint for said pieces of analysis target data with said commonality from said plurality of common analysis viewpoints in case that a difference in ranks provided for each of said expressions is equal to or greater than a predetermined threshold for said common analysis viewpoint.

* * * * *